United States Patent [19]
Freund

[11] Patent Number: 5,549,305
[45] Date of Patent: Aug. 27, 1996

[54] SOOTBLOWER PACKING GLAND

[76] Inventor: Melvin A. Freund, 797 Linncrest Dr., Westerville, Ohio 43081

[21] Appl. No.: 418,793
[22] Filed: Apr. 7, 1995
[51] Int. Cl.⁶ .................................................. F16J 15/18
[52] U.S. Cl. ........................ 277/106; 277/9; 15/316.1; 15/317
[58] Field of Search ............................. 277/9, 106, 105, 277/99, 126; 15/316.1, 317, 318, 318.1

[56] References Cited

U.S. PATENT DOCUMENTS

| 395,968 | 1/1889 | Franke | 277/106 |
|---|---|---|---|
| 1,078,784 | 11/1913 | Grisham | 277/106 |
| 1,849,912 | 3/1932 | Daddysman | 277/105 |
| 2,119,033 | 5/1938 | Andrew | 277/106 |
| 2,130,741 | 9/1938 | McClain | 277/105 |
| 2,185,450 | 1/1940 | Wagner . | |
| 2,287,207 | 6/1942 | Vedovell . | |
| 3,011,808 | 12/1961 | Tucker et al. . | |
| 3,659,862 | 5/1972 | Sebestian . | |
| 3,968,970 | 7/1976 | Vogeli . | |
| 4,437,201 | 3/1984 | Zalewski . | |
| 4,498,213 | 2/1985 | Zalewski . | |
| 5,090,087 | 2/1992 | Hipple . | |
| 5,236,074 | 8/1993 | Spock, Jr. et al. | 277/106 |
| 5,267,533 | 12/1993 | Smith . | |
| 5,277,153 | 1/1994 | Kakabaker . | |
| 5,290,010 | 3/1994 | Ridge | 277/106 |
| 5,456,447 | 10/1995 | Reynolds | 277/106 |

FOREIGN PATENT DOCUMENTS 6604  1/1895  United Kingdom .................. 277/105

Primary Examiner—William A. Cuchlinski, Jr.
Assistant Examiner—Scott W. Cummings
Attorney, Agent, or Firm—Sidney W. Millard

[57] ABSTRACT

A sootblower includes a supply tube for delivering fluid to a concentrically mounted lance tube. The lance tube reciprocates into and out of a boiler delivering fluid to clean the inside surface. Deformable packing between the inside surface of the lance tube and the outside surface of the supply tube prevents the escape of the cleaning fluid from the system. A follower gland is biased into engagement with the packing to maintain its seal when the packing wears. The bias is provided by a plurality of coil springs trapped between a pair of plates, flanges or washers suitably connected to the gland. A plurality of covered apertures in one of the flanges allows the insertion or removal of some of the springs to provide the desired degree of compression to the packing.

12 Claims, 5 Drawing Sheets

SOOTBLOWER PACKING GLAND

FIELD OF THE INVENTION

This invention relates to a sootblower for cleaning the interior surfaces of a boiler or the like by discharging a suitable cleaning fluid from a nozzle which is mounted to reciprocate within the boiler.

BACKGROUND OF THE INVENTION

Conventional sootblowers of the long retracting type include a lance tube which is moved along a horizontal path several feet in length. During the traveling motion of the lance tube it may be rotated about its longitudinal axis and a cleaning fluid discharged through one or more nozzles mounted on its forwardmost end. The fluid may be directed against various internal surfaces of the boiler to remove undesirable soot accumulations, rust, corrosion and the like.

Fluid is fed to the lance tube by a coaxially aligned feed tube. The lance tube circumscribes the feed tube. Fluids such as steam, water, detergent and mixtures thereof are delivered from one end of the feed tube to the other and then into the lance tube for discharge from the nozzles.

Various means have been suggested in the prior art for imparting movement to the lance tube and guiding it along its lengthy path as it enters and leaves the boiler. Examples of the insertion apparatus are illustrated in U.S. Pat. Nos. 4,437,201; 4,498,213; and 5,267,533. The particular means for inserting and retracting the lance tube are unrelated to the inventive concept described herein. Any of the disclosed insertion systems may be used without departing from the spirit of the inventive concept to be described subsequently. Indeed, other insertion apparatus and procedures may be incorporated using the inventive concept to be described which have not yet been disclosed in those patents. Such undisclosed apparatus would not depart from the spirit of the invention disclosed herein because this invention is concerned with the sealing structure between tubes rather than how the tubes move.

This invention is concerned with the configuration of the sealing assembly between the supply or feed tube and the lance tube of sootblower apparatus. Conventionally, a lance tube and a supply tube are concentrically mounted with the supply tube connected to a source of fluid such as steam or water under suitable pressure. The concentrically mounted lance tube is mounted at its rear most area with a carriage which supports the rear end and drives it in and out of the boiler or other heat transfer apparatus in a particular pattern. Examples of such rear mounting structure are illustrated in U.S. Pat. Nos. 2,185,450; 4,437,201; 5,090,087; and 5,277,153.

With each carriage it is conventional to have a stuffing box containing a deformable packing material which is compressed and deformed by a follower gland to provide a fluid tight seal between the external surface of the supply tube and the internal surface of the lance tube. It is well known to provide a yoke type flange structure on the rear surface of the follower gland which cooperates to maintain deforming pressure on the packing. FIGS. 1 and 2 illustrate such prior art.

In FIG. 1, a supply tube 10 is concentrically mounted about axis 12 with a lance tube 14. Lance tube 14 is illustrated as being somewhat thicker than supply tube 10 but this is misleading. The illustrated rear portion of lance tube 14 may be characterized as a hub and it may have attached thereto various flanges, gears and the like, including a roller bearing 16. During its rotation as it is advanced and retracted from the boiler by apparatus which is attached to its rear or hub end it delivers a cleaning fluid under pressure.

Mounted within a stuffing box 18 formed in the internal surface of lance tube 14 is a deformable packing 20 which forms a seal between the internal surface of lance tube 14 and the external surface of supply tube 10. Its function is to prevent the escape of cleaning fluid fed to the inside of lance tube 14 by supply tube 10. Thereby the only escape for the injected fluid is through the nozzle structure (not shown) on the forward end of the lance tube 14.

To prevent the packing 20 from escaping the stuffing box 18, a suitably off-set forward bushing 22 engages the forward end of packing 20. The rear or trailing end of the packing 20 is engaged by a cylindrical follower gland 24. Cylindrical gland 24 includes a yoke or segmented flange 26 having a pair of slots 28, 30 extending through flange 26 at diagonally opposite locations, see FIG. 2.

Studs 32, 34 are threaded into apertures 36, 38 formed in the rear end of lance tube 14. To compress and deform packing 20, the follower gland 24 is urged forward by nuts 42 tightened on the exposed ends of studs 32, 34 to engage flange 26 and drive the gland forward.

As illustrated in FIG. 1, a cylindrical washer 40 fits over each stud 32, 34 and is tightened against yoke 26 by a nut 42. To prevent nut 42 from being loosened due to vibration and the like during sootblowing operations, a locknut 44 is threaded into place to engage each tightening nut 42.

At preselected periods of time or when a leak occurs in packing 20, locknuts 44 are retracted and tightening nuts 42 are tightened against yoke 26 to urge gland 24 forward to further compress packing 20 and reseal the annulus against leakage.

The problem this creates is a lack of uniform pressure on packing 20 to maintain a uniform degree of compression. It is desirable to have a uniform application of force to such packing which will not require the manual operation just described to reseal a leak. Various solutions have been suggested to achieve this desired automatic tightening result and many involve one or more springs to achieve this constant bias against the trailing gland. Examples are illustrated and described in U.S. Pat. Nos. 2,185,450; 2,287,207; 3,011,808; 3,659,862; 3,968,970; 5,090,087; and 5,267,533.

SUMMARY OF THE INVENTION

This invention includes unique structure useful to retrofit existing sootblowing apparatus to provide a uniform pressure application to the rear surface of the packing in the stuffing box on the interior surface of the lance tube. The unique structure is adaptable to various sootblower structures and may replace existing apparatus for compressing the packing.

Several unique embodiments are disclosed to provide a sealing and support assembly between a supply tube and a lance tube in a sootblower apparatus. Each embodiment includes a pair of flanges connected together as a unit and mounted on the trailing end of the lance tube with one flange being rigidly attached to the lance tube and the other flange being mounted to reciprocate between the end of the lance tube and the rigidly attached flange.

A gland follower is mechanically secured to the reciprocating flange and is urged forward into the rear-most portion of the packing by a plurality of springs mounted between the two flanges. These springs are disposed in a geometric pattern to provide a balanced force on the reciprocating or moveable flange such that it urges the follower gland with uniform pressure against the trailing end of packing 20.

In one embodiment, one of the "flanges" is merely a plurality of independently mounted washers which serve the purpose of a stationary flange.

In order to adjust the degree of force applied by the springs, structure is provided to allow the insertion or removal of some of the springs. This is desirable because not all packing nor all sootblowers require the same pressure. Being able to remove or insert springs at the discretion of the user allows the user to retrofit his specific sealing and support assembly to accommodate the existing conditions.

Objects of the invention not understood from the above description will become abundantly clear upon a review of the drawings and the description of the preferred embodiments which follow.

DESCRIPTION OF THE PREFERRED EMBODIMENTS

Figure 1:
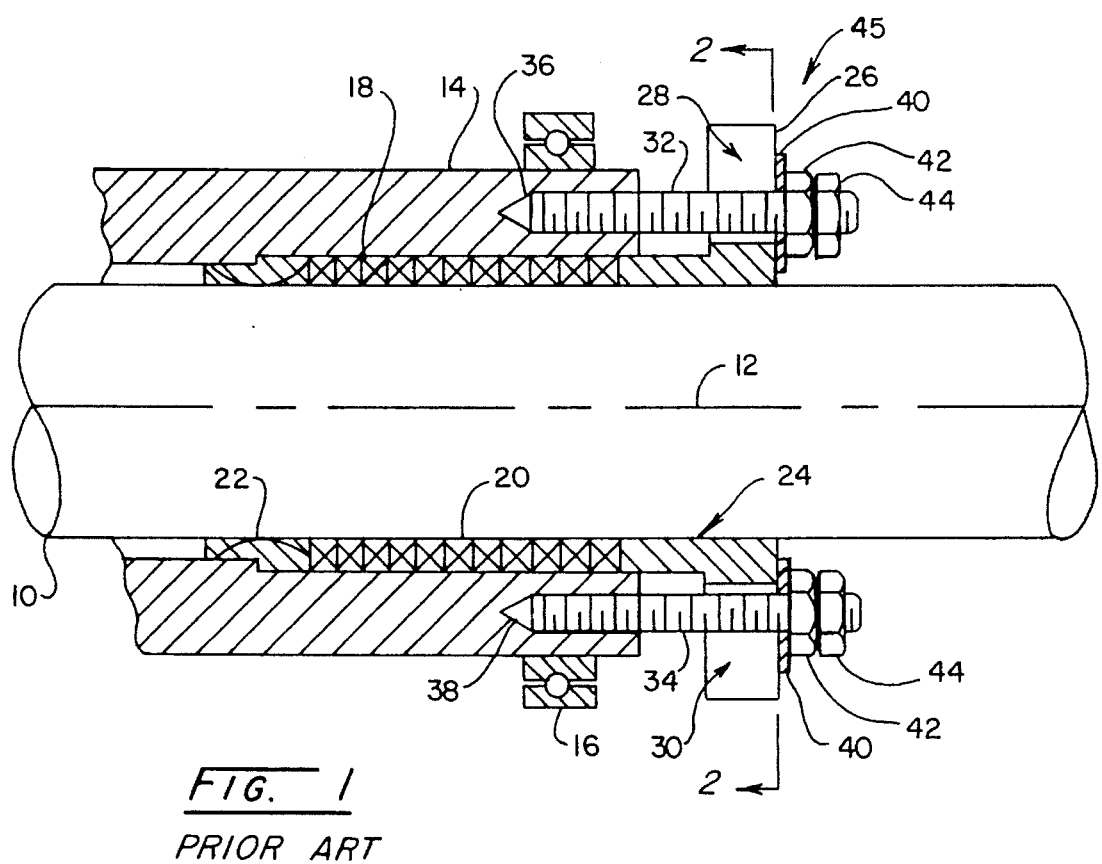
FIG. 1 is a fragmentary sectional view of a prior art, sealing and support assembly between a lance tube and a supply tube.
Figure 3:
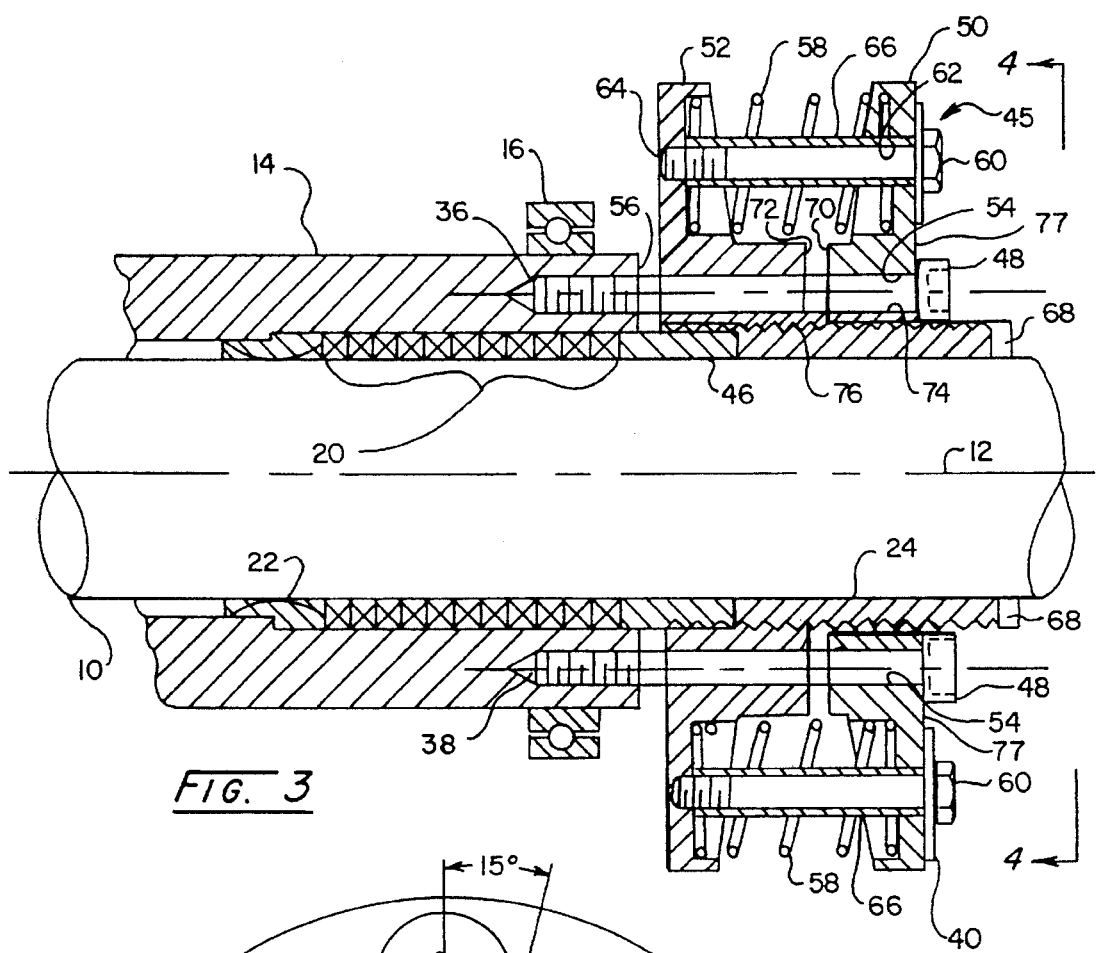
FIG. 3 is a fragmentary sectional view similar to the environment of FIG. 1 showing a sealing and support assembly between a supply tube and a lance tube in a sootblower apparatus according to this invention.
Figure 4:
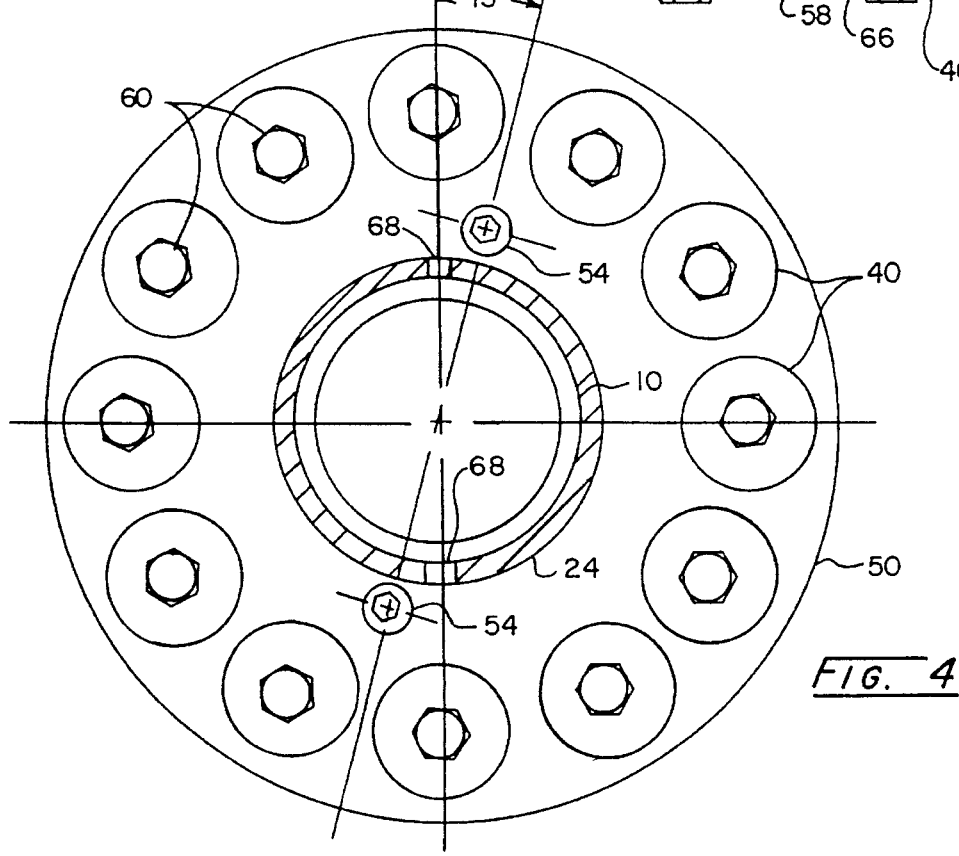
FIG. 4 is a right-hand end view of the structure of FIG. 3 taken at 4—4 of FIG. 3.
Figure 6:
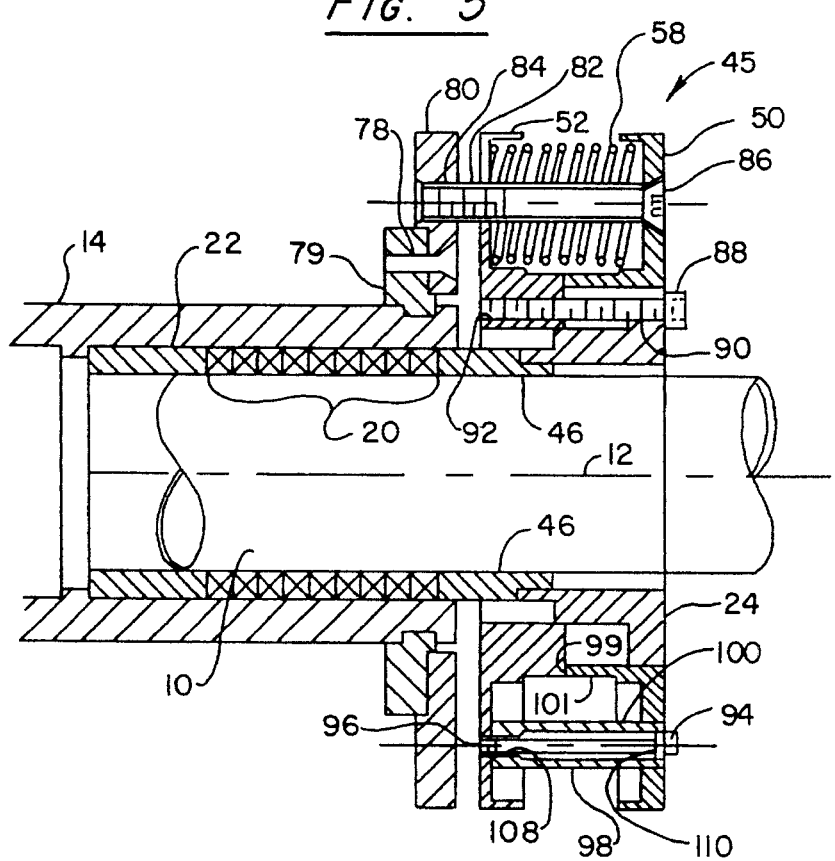
FIG. 6 is a fragmentary sectional view taken along lines 6—6 of FIG. 5.

FIGS. 3 and 6 are sectional views similar in structure to the illustrated prior art in FIG. 1. The embodiments of FIGS. 3 and 6 are retrofit structures to replace existing equipment on conventional sootblowers. Where possible the same numbers have been applied to functionally equivalent elements of FIGS. 1, 3 and 6. The elements, in combination, show an assemblage or adapter 45 mechanically secured to the lance tube 14 for exerting force on gland 24 to urge the gland toward packing 20.

Looking particularly to FIG. 3, an optional rear bushing 46 is interposed between the rear end of packing 20 and gland 24. The two may be press fitted together if desirable or combined as a single unit.

Bolts 48 are threaded into apertures 36, 38 in place of studs 32, 34 illustrated in FIG. 1 to hold an assembly in position at the rear of lance tube 14. Bolts 48 secure a pair of plates or ring shaped flanges 50, 52 in place to urge cylindrical gland 24 toward packing 20 with a balanced uniform pressure.

Bolts 48 pass through apertures 54 in flange 50 to hold it rigidly in place with respect to the rear surface 56 of lance tube 14, that is, bolt 48 secures flange 50 in place so that it cannot move transversely to the right. Flange 50 could move transversely to the left against the bias of springs 58 but that would accomplish no useful purpose under the concept of this invention and the springs would simply urge it back into the engagement with the heads of bolts 48. For purposes of this invention flange 50 is considered fixed while flange 52 is considered movable.

It is clear that springs 58 are located around the assembly 45 in a balanced pattern to provide a balanced application of force to gland or bushing 46 and packing 20.

The composite assembly or adapter 45, including flanges 50, 52 and springs 58, are assembled with suitable number of springs 58 around the periphery between the two flanges to provide the desired balanced force which will be explained in more detail subsequently. The purpose of having them preassembled as a unit is to minimize the manual labor at the boiler site. The two flanges 50, 52 are held together by threaded bolts 60 which project through openings 62 intermediate the edges of flange 50 and extend to the left to thread into threaded openings 64 in flange 52.

To allow the head of bolt 60 to serve as a gauge for the degree of compression of springs 58 and the degree of wear on packing 20, a sleeve 66 extends through opening 62 to abut flange 52 and limit the degree of tightening of bolts 60. Note the bottom section illustration in FIG. 3 to show the head of bolt 60 spaced from the rear face of flange 50.

After the assemblage of bolts, springs and flanges are assembled to the lance tube 14 by bolts 48, cylindrical gland 24 is tightened by a spanner wrench using slots 68 into the external threaded surface 76 of flange 52 to draw the flanges 50, 52 together until their facing surfaces 70, 72 are abutting or the degree of compression desired by the equipment operator has been achieved.

External threads 74 on gland 24 engage internal threads 76 on the internal cylindrical surface of flange 52 which draws flange 52 toward flange 50 and pushes the heads of bolts 60 away from the rear face 77 of flange 50. Flange 50 is held in place by the combined oppositely acting forces of the head of bolt 48 and the bias of springs 58. Then after the sootblower operation continues, the rotating and reciprocating motion by lance tube 14 with respect to supply tube 10 wears on the packing 20. Springs 58 acting on slidable flange 52 keep a relatively uniform pressure on the packing 20 and as the packing wears, rear bushing 46 is urged forward by gland 24 due to the inter-engaging threads 74, 76 between gland 24 and the internal cylindrical surface of floating flange 52.

Looking now to the first alternative embodiment illustrated in FIGS. 5–8, a collar 79 projects radially of lance tube 14 and is mechanically secured by screws 78 to a radially extending plate 80. Internally threaded sleeves 82 are welded or threaded into suitable apertures 84 in plate 80. Flange 50 is rigidly attached to lance tube 14 through collar 79, plate 80 and threaded bolts 86 which includes mating threads to engage the internal threads in threaded sleeves 82.

In the FIG. 6 embodiment, gland 24 is connected to floating flange 52 by threaded bolts 88 which pass through openings 90 in gland 24 and thread into threaded apertures 92 in floating flange 52.

In this embodiment a gauge of the degree of compression of springs 58 is achieved through a bolt 94 threaded into an opening 96 in floating flange 52. Bolt 94 extends through a sleeve or limit tube 98 which is welded or otherwise secured in an opening 100 in flange 50. Thereby, as the flanges 50, 52 separate due to wear of packing 20, the head of bolt 94 is drawn into tube 100 until it disappears. This is an indication or signal that bolts 88 should be tightened to compress springs 58.

In the embodiment illustrated in FIG. 6, abutments 99, 101 serve the same function as abutting faces 70, 72 in FIG. 3, namely, spacer elements to limit the compression of springs 58. These spacer elements prolong spring life by preventing excess compression. Additionally, over tightening of bolts 48 or 88 after the spacer elements are in abutment allows excess compression of packing 20 to insure a tight seal at the beginning of a sootblowing procedure or to protect the assembly 45 from damage when a waterhammer impact is anticipated.

Figure 5:
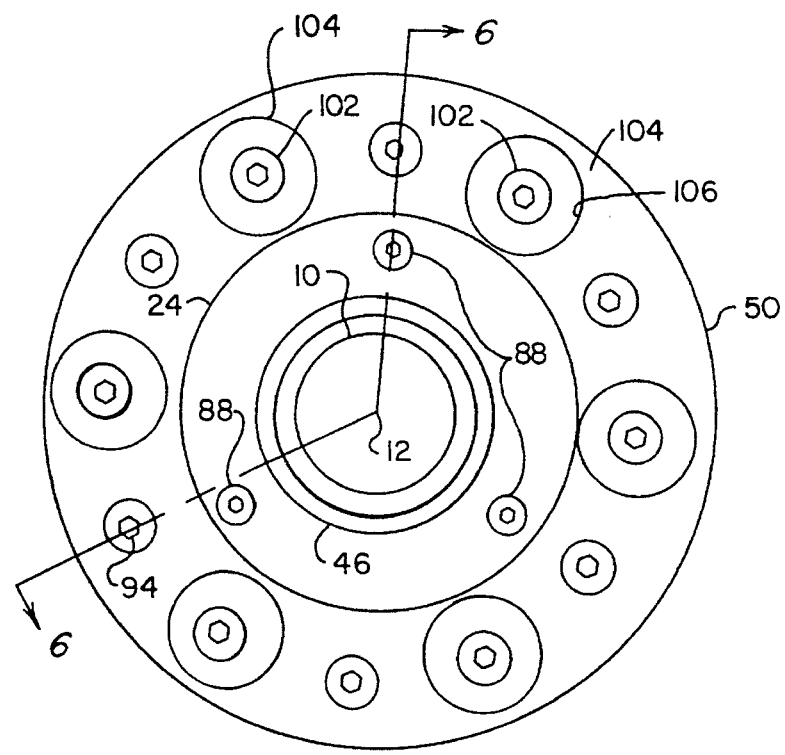
FIG. 5 is an alternative embodiment for an end view similar to FIG. 4.
Figure 7:
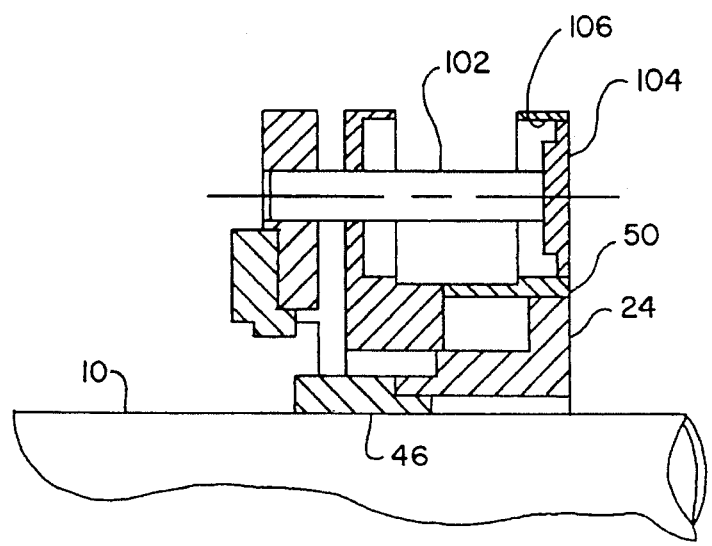
FIG. 7 is a fragmentary sectional view of yet another alternative embodiment for the sealing and support assembly of this invention.
Figure 8:
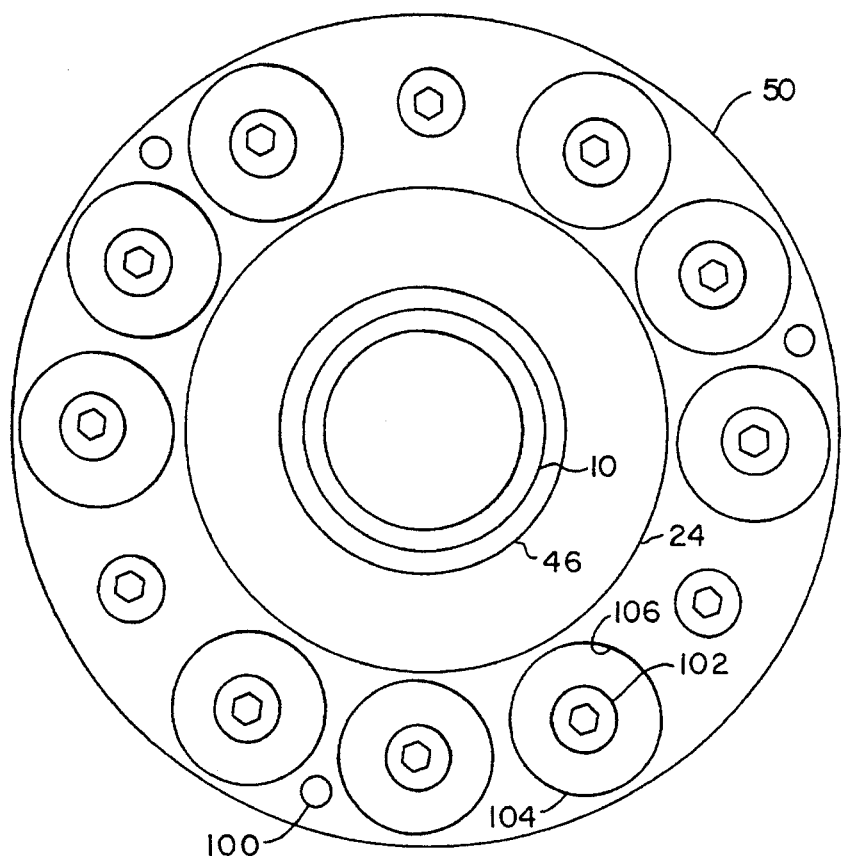
FIG. 8 is an end elevational view of FIG. 7, similar to FIG. 5 and with a different embodiment.

Looking to FIGS. 5, 7 and 8, a bolt 102 extends through a cap 104 which seats in a circular opening 106 in fixed flange 50. Such structure allows the bolts 102 to be removed, one at a time, and allows single springs 58 to be inserted or removed to achieve a different degree of compression or force to be applied to floating flange 52 at the discretion of the operator of the equipment. All this is achieved without having to remove all of the springs 58 and without having to remove flange 50 from the system to provide the adjustment needed. In this manner, the retrofit sealing and support assembly may be supplied to the operator of the equipment with two or three springs 58 in place, flanges 50, 52 secured together by bolts 102 and a supply of additional springs 58 which may be inserted at the discretion and desire of the user of the equipment.

One additional feature of the embodiment of FIG. 6 is the end flange 108 at the left end of sleeve 98 which is of smaller diameter than the head of 110 of bolt 94. This feature prevents the accidental separation of flanges 50, 52 during assembly and mounting on lance tube 14.

Each embodiment of this invention as illustrated in FIGS. 3 and 6 allows the packing 20 to be removed from stuffing box 18 and replaced without removing adapter 45 from lance tube 14. This is accomplished by unthreading gland 24 from floating flange 52 and sliding gland 24 longitudinally off the end of supply tube 10. That opens the rear bushing 46 and packing 20 for removal longitudinally along the same path.

Figure 9:
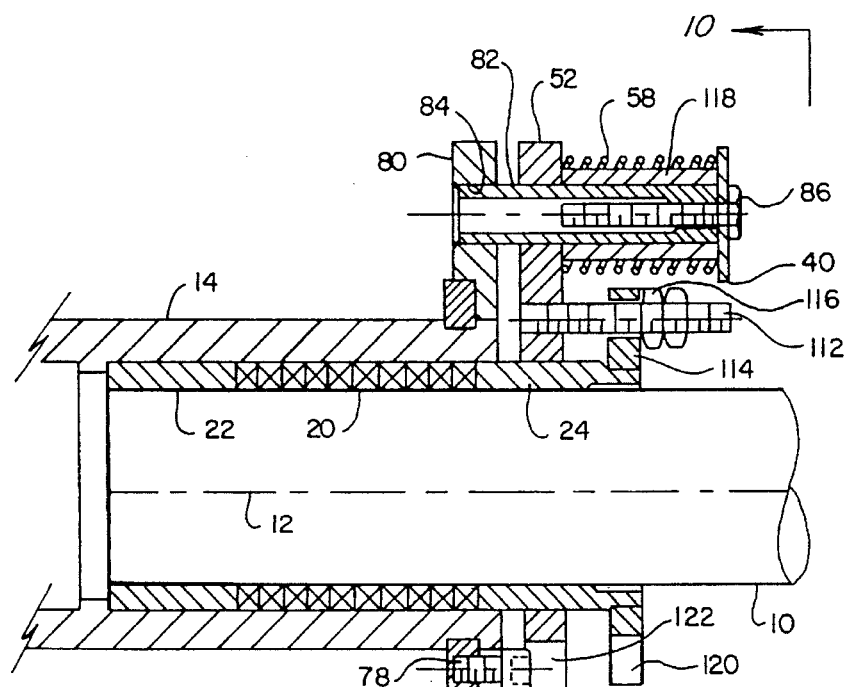
FIG. 9 is a sectional view similar to FIG. 6 showing another alternative embodiment of this invention.
Figure 10:
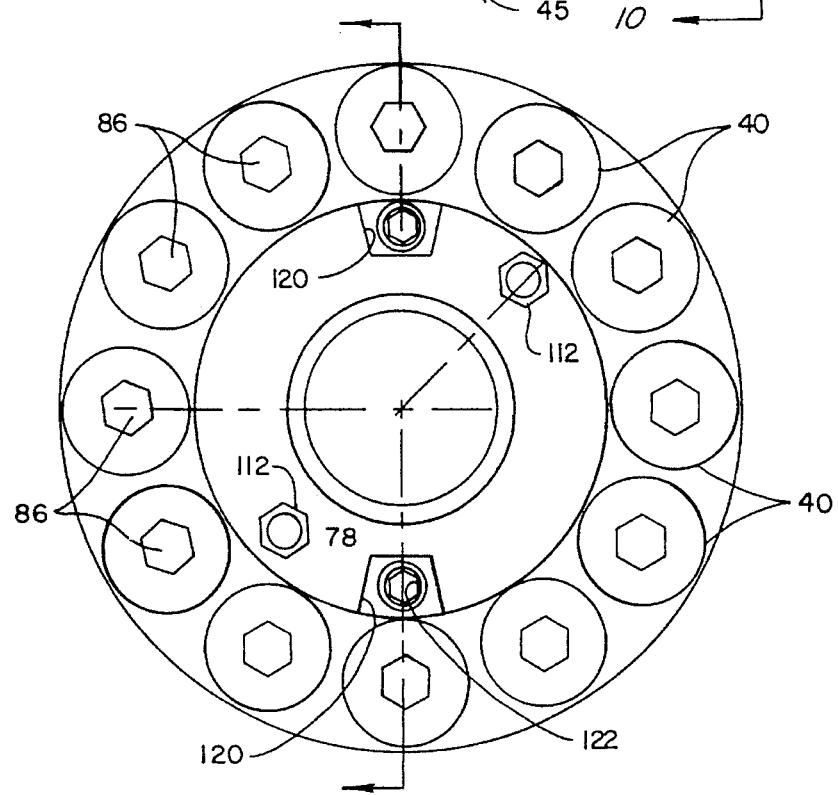
FIG. 10 is an end elevational view of FIG. 9, similar to FIG. 5.

FIGS. 9 and 10 illustrate another and more simplified embodiment where spring retainers or washers 40 take the place of fixed flange 50. That is, each washer 40 is fixed in place and together they form the fixed flange 50 illustrated in FIGS. 3–8. Threaded bolt 86 threads into internally threaded sleeve 82 to maintain washer 40 in fixed position against the end of the right hand side of sleeve 82.

Figure 2:
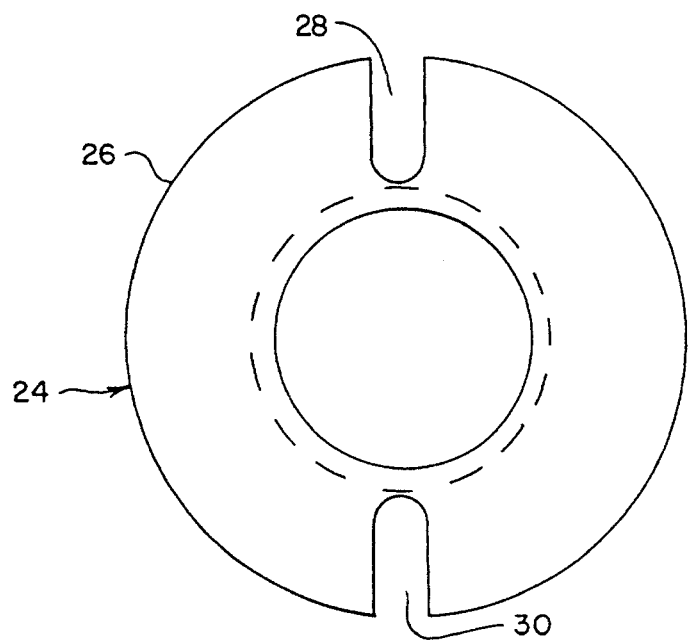
FIG. 2 is an end elevational view of a yoke taken along the line 2—2 of FIG. 1.

Studs 112 project through a radially extending flange 114 on follower gland 24 similar to yoke 26 in FIG. 2. Studs 112 are shown welded to floating flange 42. Tightening of nuts 116 pulls flange 52 into abutment with the end of guide sleeve 118 which limits compression of coil or compression springs 58. Springs 58 are guided and supported by sleeves 118 and prevent buckling of springs 58 in elongated condition.

Assemblage 45 may be removed from lance tube 14 by removing bolts 78 from collar 79 while springs 58 remain compressed between floating flange 52 and fixed flange equivalent washer 40. This is accomplished by inserting a socket or Allen wrench through gap 120 in flange 114 and through a hole 122 in flange 52 to unscrew bolt 78. This removes the whole assembly 45 and facilitates removal and replacement of gland 46 and packing 20.

It is contemplated that a rigid cover (not shown) may be applied to the assembly around the illustrated outer end of the sootblower to minimize dust, dirt and abrasive materials from contacting the moving parts.

Having thus described the invention in its preferred embodiments, it will be understood that various modifications or combinations of the described embodiments may be modified without departing from the spirit of the invention. Accordingly, it is not intended that the invention be limited by the description of the preferred embodiments nor the drawings illustrating the same. Rather it is intended that the invention be limited only by the scope of the appended claims.

I claim:

1. A sealing and support assembly between a supply tube and a lance tube in a sootblower apparatus comprising, a cylindrical supply tube mounted within a cylindrical lance tube, a cylindrical stuffing box formed on the inside of said lance tube and circumscribing said supply tube, deformable packing in said stuffing box for engaging the external surface of said supply tube and providing a fluid seal between said supply tube and said lance tube, said packing having a forward end and a trailing end, a follower gland engaging and deforming said trailing end of said packing to deform it into sealing engagement with said supply tube and said lance tube, an adapter mechanically secured to said lance tube for exerting force on said gland to urge said gland toward said packing, said adapter including a pair of annularly extending flanges circumscribing said supply tube, one of said pair of flanges being fixed to one end of said lance tube and spaced therefrom, the other of said flanges being disposed for movement along said supply tube between said fixed flange and said one lance tube end, said one flange being radially spaced from said supply tube to form an opening of a size to allow the removal of said gland without removing said adapter, said other flange being mechanically connected to said gland, a plurality of compression springs mounted between said flanges to bias said other flange toward said lance tube end and said gland toward said packing, said springs being at locations radially outward of said supply tube and configured in a pattern to provide a balanced force on said other flange.

2. The assembly of claim 1 wherein an inner surface of said one flange defines said opening as cylindrical.

3. The assembly of claim 2 wherein said cylindrical opening is of a size to allow the removal of said packing from said assembly without removing said adapter.

4. The assembly of claim 2 including plurality of apertures in said one flange covered by caps, at least some of said caps engaging one end of one of said springs, said caps being removable to allow the removal or insertion of springs to thereby adjust the force urging said gland toward said packing.

5. The assembly of claim 1 wherein the mechanical connection between said other flange and said gland comprises external threads on said gland engaging internal threads on said other flange.

6. The assembly of claim 1 wherein the mechanical connection between said other flange and said gland comprises threaded bolts or studs extending through said gland to enter threaded holes in said other flange.

7. The assembly of claim 1 including an indication rod fixed to said other flange and extending through a hole in said one flange to show the degree of compression of said springs.

8. The assembly of claim 7 wherein said indicator rod is surrounded by a limit tube, said limit tube being secured to said one flange around said hole, the rod including an enlarged head on its end penetrating said hole, said limit tube including an opening of reduced area at its end remote from said one flange opening, said head size being greater than said limit tube opening to thereby limit separation of said flanges due to force exerted by said springs.

9. The assembly of claim 1 including spacer elements between said flanges to limit compression of said springs.

10. The assembly of claim 1 including spacer elements between said flanges to allow said mechanical connection between said gland and said other flange to be tightened and thereby exert greater deforming force on said packing by said gland.

11. The assembly of claim 1 including plurality of apertures in said one flange covered by caps, at least some of said caps engaging one end of one of said springs, said caps being removable to allow the removal or insertion of springs to thereby adjust the force urging said gland toward said packing.

12. The assembly of claim 1 wherein said one flange comprises a plurality of washers located between said springs and a bolt and said other flange.

* * * * *